United States Patent
Zhou et al.

(10) Patent No.: US 10,140,251 B2
(45) Date of Patent: Nov. 27, 2018

(54) PROCESSOR AND METHOD FOR EXECUTING MATRIX MULTIPLICATION OPERATION ON PROCESSOR

(71) Applicant: Beijing Baidu Netcom Science and Technology Co., Ltd., Beijing (CN)

(72) Inventors: Ni Zhou, Beijing (CN); Wei Qi, Beijing (CN); Yong Wang, Beijing (CN); Jian Ouyang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 15/590,798

(22) Filed: May 9, 2017

(65) Prior Publication Data

US 2018/0107630 A1  Apr. 19, 2018

(30) Foreign Application Priority Data

Oct. 13, 2016 (CN) .......................... 2016 1 0894738

(51) Int. Cl.
G06F 17/16 (2006.01)
G06F 9/38 (2018.01)
G06N 99/00 (2010.01)

(52) U.S. Cl.
CPC ............ *G06F 17/16* (2013.01); *G06F 9/3895* (2013.01); *G06N 99/005* (2013.01)

(58) Field of Classification Search
CPC ....................................................... G06F 17/16
See application file for complete search history.

(56) References Cited

U.S. PATENT DOCUMENTS

2011/0153707 A1* 6/2011 Ginzburg .............. G06F 9/3001
708/523
2013/0262548 A1* 10/2013 Ge .......................... G06F 17/16
708/520

(Continued)

FOREIGN PATENT DOCUMENTS

CN 102411558 A 4/2012
CN 103294648 A 9/2013

OTHER PUBLICATIONS

Lin Y.K., "Crucial Technology Research on High Performance Parallel Multiplier," Master Dissertation, Jan. 15, 2010, Xian Electronics Technology University, pp. 11-12, Fig. 2.7 (3 pages).

*Primary Examiner* — Chuong D Ngo
(74) *Attorney, Agent, or Firm* — Nixon Peabody LLP

(57) ABSTRACT

A processor and a method for executing a matrix multiplication operation on a processor. A specific implementation of the processor includes a data bus and an array processor having k processing units. The data bus is configured to sequentially read n columns of row vectors from an M×N multiplicand matrix and input same to each processing unit in the array processor, read an n×k submatrix from an N×K multiplier matrix and input each column vector of the submatrix to a corresponding processing unit in the array processor, and output a result obtained by each processing unit after executing a multiplication operation. Each processing unit in the array processor is configured to execute in parallel a vector multiplication operation on the input row and column vectors. Each processing unit includes a Wallace tree multiplier having n multipliers and n−1 adders. This implementation improves the processing efficiency of a matrix multiplication operation.

12 Claims, 6 Drawing Sheets

(56) References Cited

U.S. PATENT DOCUMENTS

2017/0270073 A1\* 9/2017 Badin ...................... G06N 3/00
2018/0006664 A1\* 1/2018 Langhannnner ..... H03M 13/611

\* cited by examiner

PROCESSOR AND METHOD FOR EXECUTING MATRIX MULTIPLICATION OPERATION ON PROCESSOR

CROSS-REFERENCE TO RELATED APPLICATION

This application claims priority to Chinese Patent Application No. 201610894738.6, entitled "Processor and Method for Executing Matrix Multiplication Operation on Processor," filed on Oct. 13, 2016, the content of which is incorporated herein by reference in its entirety.

TECHNICAL FIELD

The present application relates to the field of computer technology, specifically to the field of computer hardware technology, and more specifically to a processor and a method for executing a matrix multiplication operation on a processor.

BACKGROUND

Deep learning technology is the core of artificial intelligence, and plays an important role in the promotion of many applications. A deep learning algorithm is a typical computing-intensive algorithm. As the core part of the algorithm, matrix multiplication is a computing- and data-intensive operation. In scenarios requiring high computational efficiency, a matrix algorithm generally needs to be executed by a dedicated FPGA- or ASIC-based processor. The dedicated processor can provide a large number of customized computing and storage resources. Using a reasonable computing element and storage structure in the part of the dedicated processor that is used to execute the matrix multiplication algorithm will greatly reduce the consumption of circuit resources and the design complexity, and improve the price performance ratio and the energy consumption ratio of a chip.

In a hardware architecture for executing a matrix multiplication algorithm in an existing dedicated processor, parallelism is generally mined in M and K dimensions when an M×N matrix and an N×K matrix are multiplied. However, because the multiplicand matrix of the matrix multiplication operation involved in the deep learning algorithm often has a small number of rows or even has only one row, mining parallelism in the M dimension easily leads to poor universality in architecture. If parallelism is mined only in the K dimension, the degree of parallelism is limited to the range of K in applications, limiting the computing performance, resulting in a low utilization ratio.

SUMMARY

An objective of the present application is to provide an improved a processor and a method for executing a matrix multiplication operation on a processor, in order to solve the technical problem mentioned in the foregoing Background section.

According to a first aspect, the present application provides a processor, comprising a data bus and an array processor having k processing units, wherein the sequentially read 1×n row vectors from an M×N multiplicand matrix and input the 1×n row vectors to each processing unit in the array processor comprises: buffer the M×N multiplicand matrix to the first on-chip memory unit; sequentially read the 1×n row vectors of the M×N multiplicand matrix from the first on-chip memory unit and input the 1×n row vectors to the each processing unit in the array processor, wherein the read an n×k submatrix from an N×K multiplier matrix and input each of n×1 column vectors of the n×k submatrix to a corresponding processing unit in the array processor comprises: buffer the N×K multiplier matrix to the second on-chip memory unit; read an n×k submatrix of the N×K multiplier matrix from the second on-chip memory unit and input each of the n×1 column vectors of the n×k submatrix to the corresponding processing unit in the array processor respectively, wherein the output a result obtained by each processing unit after executing a vector multiplication operation comprises: output a result obtained by the each processing unit after executing the vector multiplication operation to the third on-chip memory unit; and buffer data of the third on-chip memory unit.

In some embodiments, the processor further comprises a first on-chip memory unit, a second on-chip memory unit, and a third on-chip memory unit; and the data bus is further configured to: buffer the multiplicand matrix and the multiplier matrix to the first on-chip memory unit and the second on-chip memory unit respectively; sequentially read a corresponding row vector and column vector respectively from the first on-chip memory unit and the second on-chip memory unit to each processing unit; output a result obtained by each processing unit after executing a vector multiplication operation to the third on-chip memory unit; and buffer data of the third on-chip memory unit.

In some embodiments, the buffer operations of the data bus and the vector multiplication operations of the processing units in the array processor are executed in parallel in a back-and-forth manner.

In some embodiments, the first on-chip memory unit stores data in units of rows, and the second on-chip memory unit stores data in units of columns.

In some embodiments, the third on-chip memory unit stores data in units of rows.

According to a second aspect, the present application provides a method for executing a matrix multiplication operation on a processor, wherein the processor comprises an array processor having k processing units, the method comprising: reading 1×n row vectors in an M×N multiplicand matrix to each processing unit in the array processor, each processing unit comprising a Wallace tree multiplier having n multipliers and n−1 adders; reading each of n×1 rcolumn vectors in an n×k submatrix in an N×K multiplier matrix to a corresponding processing unit in the array processor respectively; executing in parallel a vector multiplication operation on each column vector and the row vector by using the processing units, the Wallace tree multiplier in each processing unit being configured to execute in parallel a multiplication operation and an addition operation in the vector multiplication operation; and outputting a result obtained by each processing unit after executing the multiplication operation, wherein n, k, M, and N are integers greater than 1.

In some embodiments, the processor further comprises a first on-chip memory unit, a second on-chip memory unit, and a third on-chip memory unit; the reading 1×n row vectors in an M×N multiplicand matrix to each processing unit comprises: buffering the multiplicand matrix to the first on-chip memory unit, and sequentially reading a row vector from the first on-chip memory unit to each processing unit in the array processor; the reading each of n×1 rcolumn vectors in an n×k submatrix in an N×K multiplier matrix to a corresponding processing unit respectively comprises: buffering the multiplier matrix to the second on-chip memory unit, and sequentially reading a corresponding submatrix from the second on-chip memory unit and outputting column vectors in the submatrix to corresponding processing units in the array processor respectively; and the outputting a result obtained by each processing unit after executing the multiplication operation comprises: outputting a result obtained by each processing unit after executing a vector multiplication operation to the third on-chip memory unit, and buffering data of the third on-chip memory unit.

In some embodiments, the vector multiplication operations and the data buffer operations are executed in parallel in a back-and-forth manner.

In some embodiments, the method further comprises: storing data on the first on-chip memory unit in units of rows; and storing data on the second on-chip memory unit in units of columns.

In some embodiments, the method further comprises: storing data on the third on-chip memory unit in units of rows.

According to the processor and the method for executing a matrix multiplication operation on the processor as provided in the present application, when a matrix multiplication operation is performed, parallelism is not mined in the M dimension, to ensure high universality in architecture when the processor processes a deep learning algorithm involving multiplication operations of a large number of vectors and matrixes. In addition, the multiple PEs in the array processor and the Wallace tree multipliers inside the PEs can separately mine parallelism in the K dimension and the N dimension of the matrixes, so that the overall degree of parallelism is further improved, thereby accelerating the processing of the matrix multiplication operation.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
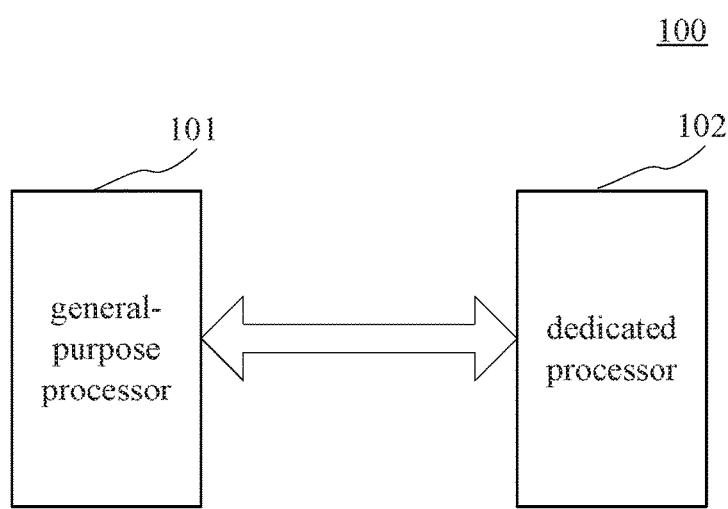
FIG. 1 is an architectural diagram of an exemplary system in which the present application may be implemented.

FIG. 1 illustrates an exemplary system architecture 100 to which a processor or a method for executing a matrix multiplication operation on a processor according to embodiments of the present application is applicable.

As shown in FIG. 1, the system architecture 100 may include a general-purpose processor 101 and a dedicated processor 102.

The general-purpose processor 101 is configured to send an external instruction (for example, a matrix operation instruction) and data to be processed (for example, a matrix) to the dedicated processor 102. The dedicated processor 102 may generate a control signal according to the external instruction, use the control signal to control devices therein to execute a data processing operation (for example, a matrix operation), and send a result generated from the processing back to the general-purpose processor 101, finally. The general-purpose processor 101 may also be referred to as a host, and the dedicated processor 102 may be designed from a Field-Programmable Gate Array (FPGA).

It should be noted that the processor provided in embodiments of the present application generally refers to the dedicated processor 102 in FIG. 1, and correspondingly, the method for performing a matrix multiplication operation on a processor is generally performed by the dedicated processor 102.

It should be understood that the numbers of the general-purpose processor 101 and the dedicated processor 102 in FIG. 1 are merely schematic. There may be any number of general-purpose processors and any number of dedicated processors as required in practice.

Figure 2:
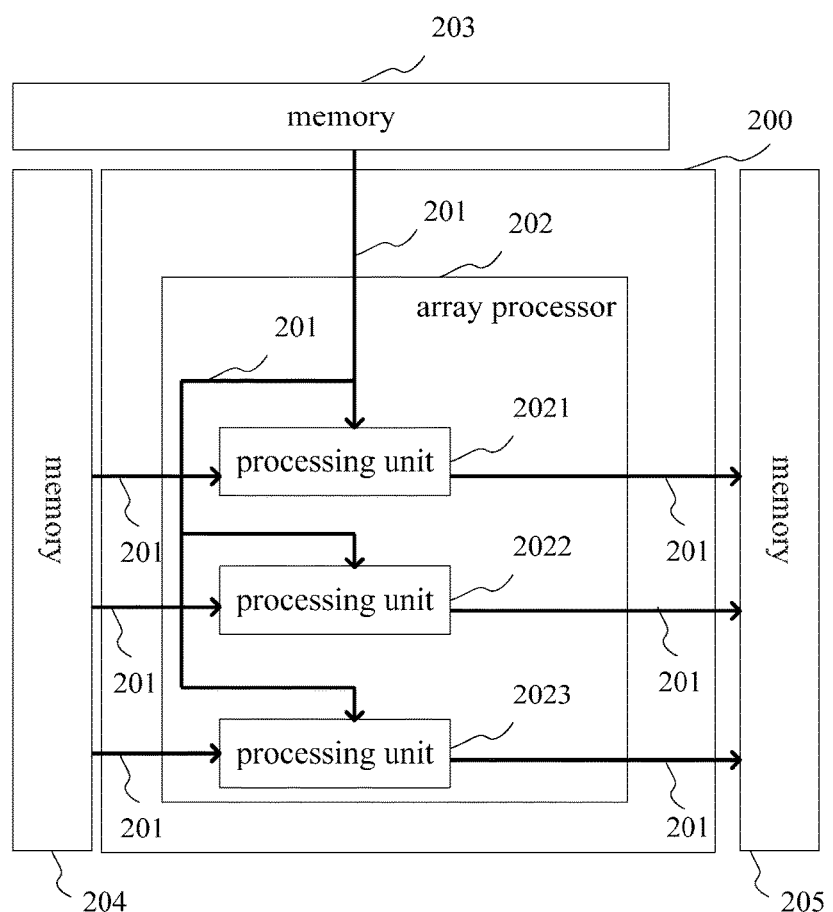
FIG. 2 is a schematic structural diagram of a processor according to an embodiment of the present application.

Referring to FIG. 2, a schematic structural diagram of a processor 200 according to the present application is illustrated.

As shown in FIG. 2, the processor 200 includes a data bus 201 and an array processor 202. The array processor 202 includes a processing unit (PE) 2021, a processing unit 2022, and a processing unit 2023. It should be noted that the numbers of parts in the figure are merely schematic, and there may be any number of data buses and array processors. The number of PEs in the array processor 202 is k (k is an integer greater than 1), and is not limited to three shown in the figure.

The data bus 201 may be configured to read data from memories that store a multiplicand matrix and a multiplier matrix on which a matrix multiplication operation is to be executed, and input the data to corresponding processing units in the array processor 202. Taking an M×N (both M and N are integers greater than 1) multiplicand matrix and an N×K (K is an integer greater than 1) multiplier matrix as an example, the data bus 201 may sequentially read 1×n row vectors from a multiplicand matrix in an external memory 203 and input same to each processing unit in the array processor 202. In the meanwhile, the data bus 201 may sequentially read an n×k (n is an integer greater than 1) submatrix from a multiplier matrix in an external memory 204, and input k column vectors in the n×k submatrix to corresponding PEs in the k PEs in the array processor 202. In this way, data read by each PE is the same 1×n row vectors and different n×1 rcolumn vectors. In addition, the data bus 201 may be further configured to output a computing result generated from the processing by each PE to an external memory 205. It should be noted that the memory 203, the memory 204, and the memory 205 may be identical or different devices.

The k PEs in the array processor 202 may simultaneously perform a vector multiplication operation according to the 1×n row vectors and the n×1 rcolumn vectors that are input to each PE. In this way, the k PEs in the array processor 202 may process k vector multiplication operations in parallel.

Each PE in the array processor 202 may include a Wallace tree multiplier having n multipliers and n−1 adders. In the Wallace tree multiplier, the n multipliers are disposed in parallel, and the n−1 adders are configured as multiple adder groups connected in series with each other. Each adder group includes one or more adders disposed in parallel. The numbers of adders in the adder groups are sequentially n/2, n/4, . . . , and 1. Products obtained from operations performed by every two multipliers are input to adders in a first adder group, and sums obtained from operations performed by every two adders in each adder group are input to adders in a subsequent adjacent adder group. In this way, when the vector multiplication operation is executed on the 1×n row vectors and the n×1 rcolumn vectors, multiplication operations of corresponding components may be executed in parallel. In addition, when an accumulative operation is performed on the products obtained from the multiplication operations, addition operations may be executed in parallel.

Figure 3:
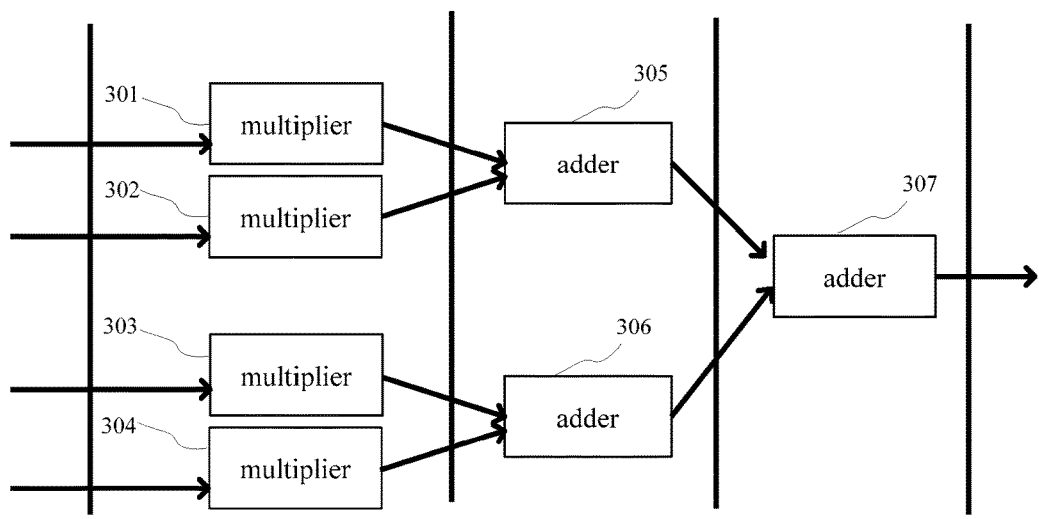
FIG. 3 is a schematic structural diagram of a processing unit in an array processor according to the embodiment corresponding to FIG. 2.

FIG. 3 is a schematic structural diagram of each PE when n is 4. As shown in FIG. 3, the Wallace tree multiplier included in the PE is formed by three parts connected in series, namely, four multipliers 301, 302, 303, and 304 disposed in parallel, two adders 305 and 306 disposed in parallel, and an independently disposed adder 307. The four multipliers 301, 302, 303, and 304 disposed in parallel may be configured to perform a multiplication operation on components corresponding to four columns of row vectors and four rows of column vectors. The results of the multipliers 301 and 302 are input to the adder 305, and the results of the multipliers 303 and 304 are input to the adder 306. The adder 305 and the adder 306 are configured to execute corresponding addition operations in parallel. The operation results of the adder 305 and the adder 306 are both input to the adder 307, and the adder 307 performs an addition operation and outputs a result. In the Wallace tree multiplier, the four multipliers 301, 302, 303, and 304 disposed in parallel can implement the mining of parallelism in the N dimension, and the adder 305 and the adder 306 also can improve the operation parallelism.

According to the processor provided in the above-mentioned embodiment of the present application, when a matrix multiplication operation is performed, parallelism is not mined in the M dimension, to ensure high universality in architecture when the processor processes a deep learning algorithm involving multiplication operations of a large number of vectors and matrixes. In addition, the multiple PEs in the array processor and the Wallace tree multipliers inside the PEs can separately mine parallelism in the K dimension and the N dimension of the matrixes, so that the overall degree of parallelism is further improved, thereby accelerating the processing of the matrix multiplication operation.

Figure 4:
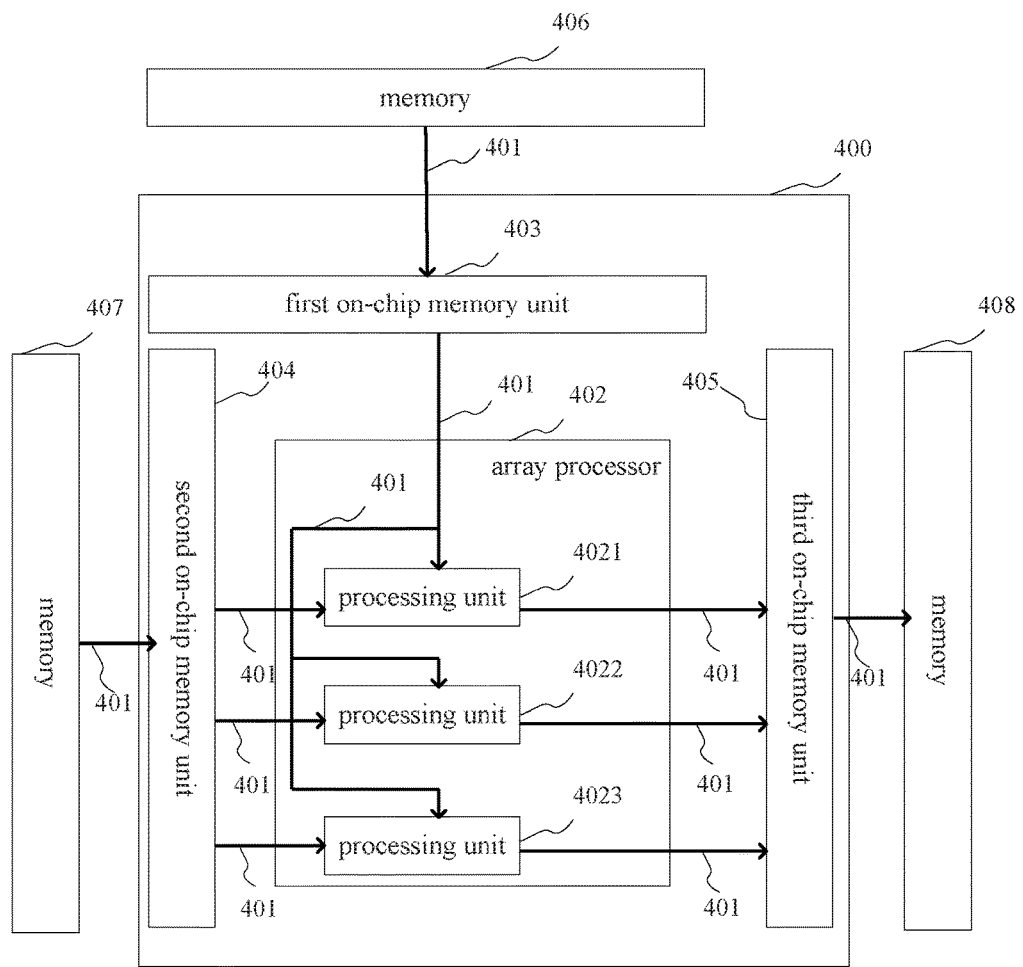
FIG. 4 is a schematic structural diagram of a processor according to another embodiment of the present application.

Referring to FIG. 4, a schematic structural diagram of another processor 400 according to the present application is illustrated.

As shown in FIG. 4, the processor 400 may include a data bus 201, an array processor 402, a first on-chip memory unit 403, a second on-chip memory unit 404, and a third on-chip memory unit 405.

The structures of the array processor 402 and processing units therein can be referred to the array processor 202 in the embodiment corresponding to FIG. 2, and will not be repeated here. The above-mentioned data bus 401 is configured to perform the following steps: buffering the multiplicand matrix and the multiplier matrix from external memories 406 and 407 to the first on-chip memory unit 403 and the second on-chip memory unit 404; sequentially reading a corresponding row vector and column vector respectively from the first on-chip memory unit 403 and the second on-chip memory unit 404 to each processing unit; outputting a result obtained by each processing unit after executing a vector multiplication operation to the third on-chip memory unit 405; and buffering data of the third on-chip memory unit to an external memory 408.

Optionally, the first on-chip memory unit 403, the second on-chip memory unit 404, and the third on-chip memory unit 405 may be static random access memories. Such memories can save data stored therein without a refresh circuit, has high performance, and requires low power consumption.

Optionally, the second on-chip memory unit 404 may include k memory subunits, and each memory subunit stores k column vectors in an n×k submatrix, so that the data bus 401 may read data respectively from the memory subunits to a corresponding PE in the array processor 402. Similarly, the third on-chip memory unit 405 may also include k memory subunits, so that the data bus 401 may write an operation result obtained by each PE in the array processor 402 to a corresponding memory subunit in the third on-chip memory unit 405.

In some optional implementations of this embodiment, the buffer operations of the data bus 401 and the vector multiplication operations of the processing units in the array processor 402 are executed in parallel in a back-and-forth manner. In this implementation, the data buffer operations and the vector multiplication operations may be executed in parallel, so that the time for reading data from an off-chip memory and the time for buffering data to an off-chip memory may be covered by the time required for executing the vector multiplication operations, thereby further reducing the time required for executing the matrix multiplication operation.

In some optional implementations of this embodiment, the first on-chip memory unit 403 may store data in units of rows, and the second on-chip memory unit 404 may store data in units of columns. Because the first on-chip memory unit 403 may store data in units of rows and the second on-chip memory unit 404 may store data in units of columns, when the data bus 401 needs to read a row vector from the first on-chip memory unit 403 and read a column vector from the second on-chip memory unit 404 to a PE in the array processor 402, the data bus 401 may directly read the required row vector from data in a row in the first on-chip memory unit 403 and read the required column vector from data in a column in the second on-chip memory unit 404, thereby improving the reading efficiency.

In some optional implementations of this embodiment, the third on-chip memory unit 405 may store data in units of rows. In the deep learning algorithm, the result of one matrix multiplication operation is usually used as the multiplicand matrix of a next matrix multiplication operation. Therefore, when the third on-chip memory unit 405 stores data in units of rows, the first on-chip memory unit 403 may directly read data from the third on-chip memory unit 405, and use the data in the next matrix multiplication operation without performing any processing.

Compared with the processor provided in the embodiment corresponding to FIG. 2, the processor provided in the above-mentioned embodiment of the present application is additionally provided with on-chip memory units configured to serve as a read buffer respectively for the multiplicand matrix and the multiplier matrix and an on-chip memory unit configured to serve as a write buffer for the operation result, thereby avoiding waiting for the time for reading data from an off-chip memory and writing data to an off-chip memory each time a segment of the matrix multiplication operation is performed by using the array processor 202, and eliminating the requirements on off-chip bandwidth in the case of reuse of a large amount of data. This helps improve the overall processing efficiency.

Figure 5:
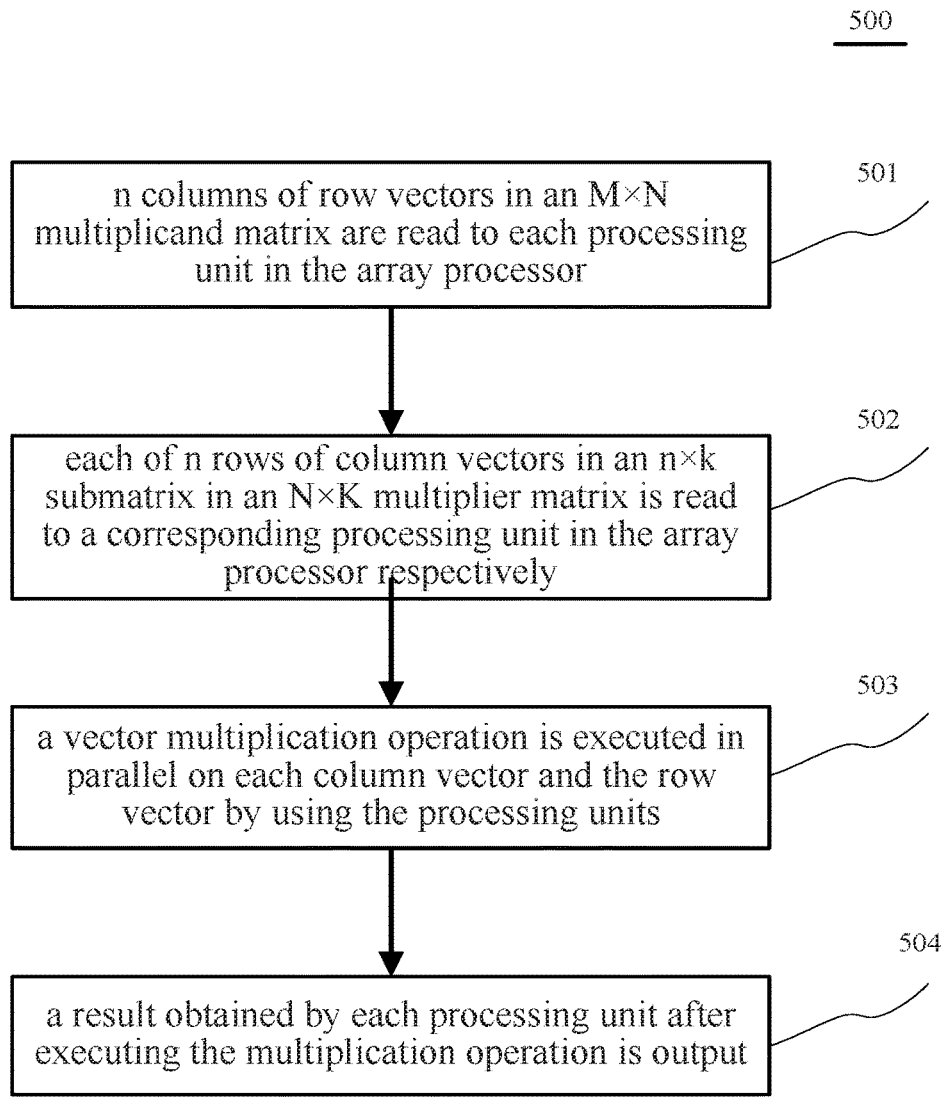
FIG. 5 is a flow chart of a method for executing a matrix multiplication operation on a processor according to an embodiment of the present application.

Referring to FIG. 5, a flow 500 of a method for executing a matrix multiplication operation on a processor according to an embodiment of the present application is illustrated. The processor includes an array processor having k processing units. The method for performing a matrix multiplication operation on a processor includes the following steps.

At step 501, 1×n row vectors in an M×N multiplicand matrix are read to each processing unit in the array processor.

In this embodiment, the processor (for example, the dedicated processor 102 in FIG. 1) first reads data from an M×N multiplicand matrix. The multiplicand matrix may be stored in an off-chip memory unit (for example, a memory in a CPU of a general-purpose processor), and the processor can read corresponding data from the memory unit. It should be noted that the multiplicand matrix may alternatively be stored in other memory units. During reading, the processor reads 1×n row vectors in the multiplicand matrix each time. Because the multiplicand matrix has N columns, traversing data in one row of the multiplicand matrix once requires N/n times of reading. Each time a row vector is read, the row vector may be input to each PE in the array processor. That is, k PEs share a same row vector.

At step 502, each of n×1 rcolumn vectors in an n×k submatrix in an N×K multiplier matrix is read to a corresponding processing unit in the array processor respectively.

In this embodiment, corresponding to the row vector that is read and input to each processing unit at step 501, the processor may read an n×k submatrix from the N×K multiplier matrix each time. For the n×k submatrix that is read each time, the processor may input k column vectors to k PEs in the array processor respectively, each column vector being corresponding to one PE, so as to ensure that the k PEs can simultaneously process k vector multiplication operations in subsequent processes, thereby implementing parallel processing in the K dimension.

At step 503, a vector multiplication operation is executed in parallel on each column vector and the row vector by using the processing units.

In this embodiment, based on data that is read and input to each processing unit in the array processor each time, the processor may execute a multiplication operation of the row vector and the submatrix by using the processing units in the array processor, where each processing unit executes a vector multiplication operation of the row vector and one column vector. Specifically, because the k processing units read the same row vector, and each processing unit reads a different column vector in the n×k submatrix, the k processing units can implement in parallel the operations on the k column vectors and one row vector.

Further, because each processing unit includes a Wallace tree multiplier having n multipliers and n−1 adders, each processing unit may use the n multipliers to simultaneously execute multiplication operations on n components involved in the multiplication of the 1×n row vectors and the n×1 rcolumn vectors. Each time, n digital multiplication operations may be processed in parallel. In the meanwhile, digital addition operations involved in the vector multiplication operation may also be performed in parallel by using the adders disposed in the Wallace tree multiplier, thereby implementing the mining of parallelism in the N dimension of the multiplier matrix and further improving the processing parallelism, thus improving the overall processing efficiency.

At step 504, a result obtained by each processing unit after executing the multiplication operation is output.

Based on the vector multiplication operation executed by each processing unit at step 503, the processor may output the result obtained by each processing unit after executing the multiplication operation. Because data that is read to the array processor each time at step 501 is only a vector having a length of n in one row of data having a length of N in the multiplicand matrix, and data that is read each time at step 202 is only an n×k submatrix in the N×K multiplier matrix, it can be seen that the steps in the above-mentioned solution generally need to be executed in a loop multiple times in order to complete the entire matrix multiplication operation.

Figure 6:
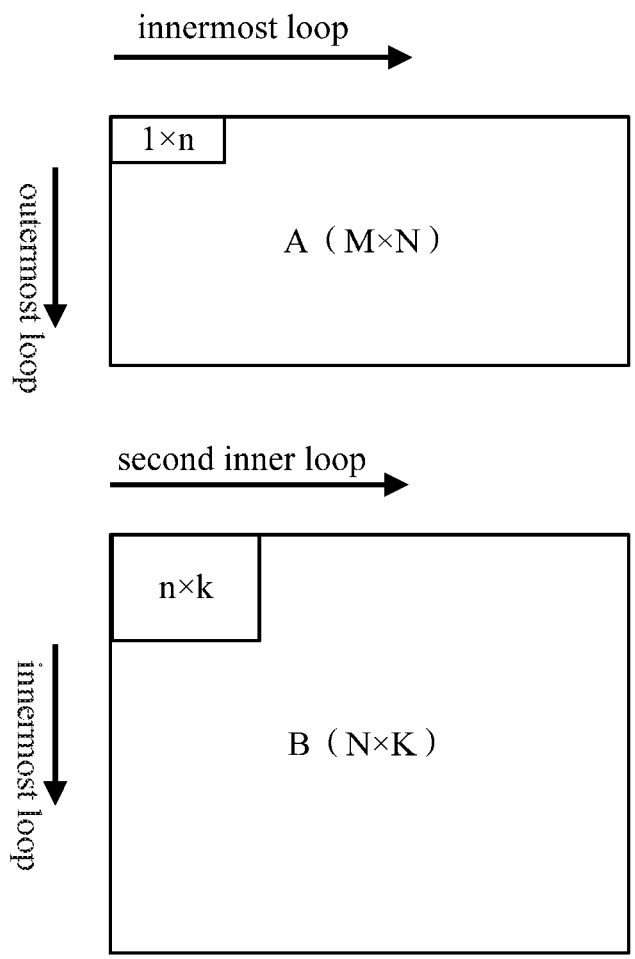
FIG. 6 is a schematic diagram of a loop execution of the method in the embodiment of FIG. 5.

In some optional implementations of this embodiment, the processor may perform step 501 and step 502 in a loop according to the manner shown in FIG. 6, so as to finish a complete matrix multiplication operation. As shown in FIG. 6, a matrix multiplication operation between a multiplicand matrix A (M×N) and a multiplier matrix B (N×K) is executed. The loop may include an innermost loop, a second inner loop, and an outermost loop.

In the innermost loop, data in one row and N columns in the multiplicand matrix may be traversed by performing step 501, that is, 1×n row vectors are read along the direction of the N dimension of the multiplicand matrix each time. Correspondingly, in the innermost loop, data in n rows and k columns in the multiplier matrix may be traversed by performing step 502, that is, a submatrix having n rows and k columns is read along the direction of the N dimension of the multiplier matrix each time. Each time the innermost loop is completed once, a multiplication operation of data in one row in the multiplicand matrix and data in n rows and k columns in the multiplier matrix is completed. As can be seen, each time the innermost loop is executed N/n times, the subsequent execution of the second outer loop may be triggered once.

In the second inner loop, each time the innermost loop is completed once, data in next n rows and k columns in the K direction in the multiplicand matrix may be traversed by performing step 502, and data in one row and N columns may be traversed again by performing step 502. Each time the second inner loop is completed once, a multiplication operation of data in one row in the multiplicand matrix and the entire multiplier matrix is completed. As can be seen, each time the middle loop is executed K/k times, the subsequent execution of the outermost loop may be triggered once.

In the outermost loop, after all the data in the multiplier matrix has been traversed, data in a next row and N columns in the direction of the M dimension in the multiplicand matrix may be traversed by performing step 501, until all the M rows of the multiplicand matrix have been processed. As can be seen, each time the outermost loop is executed M times, a complete matrix multiplication operation is finished.

In some optional implementations of this embodiment, the above-mentioned processor further includes a first on-chip memory unit, a second on-chip memory unit, and a third on-chip memory unit. In this case, step 501 includes: buffering the multiplicand matrix to the first on-chip memory unit, and sequentially reading a row vector from the first on-chip memory unit to each processing unit in the array processor. Step 502 may include: buffering the multiplier matrix to the second on-chip memory unit, and sequentially reading a corresponding submatrix from the second on-chip memory unit and outputting column vectors in the submatrix to corresponding processing units in the array processor respectively. Step 504, that is, outputting a result obtained by each processing unit after executing the multiplication operation, may include: outputting a result obtained by each processing unit after executing a vector multiplication operation to the third on-chip memory unit, and buffering data of the third on-chip memory unit. Specific execution of this implementation can be referred to the corresponding description in the embodiment corresponding to FIG. 4, and will not be repeated here.

In some optional implementations of this embodiment, the vector multiplication operations and the data buffer operations involved at step 501, step 502, step 503, and step 504 may be executed in parallel. The operations involved at step 503 are the vector multiplication operations, and the operations involved at step 501, step 502, and step 504 are data buffer operations. Specific implementation of this implementation can be referred to the corresponding implementation in the embodiment corresponding to FIG. 4, and will not be repeated here.

In some optional implementations of this embodiment, the above-mentioned method further includes: storing data on the first on-chip memory unit in units of rows; and storing data on the second on-chip memory unit in units of columns. Specific implementation of this implementation can be referred to the corresponding implementation in the embodiment corresponding to FIG. 4, and will not be repeated here.

In some optional implementations of this embodiment, the above-mentioned method further includes: storing data on the third on-chip memory unit in units of rows. Specific implementation of this implementation can be referred to the corresponding implementation in the embodiment corresponding to FIG. 4, and will not be repeated here.

According to the method provided in the above-mentioned embodiment of the present application, when a matrix multiplication operation is performed, parallelism is not mined in the M dimension, so as to ensure high universality in architecture when the processor processes a deep learning algorithm involving multiplication operations of a large number of vectors and matrixes. In addition, the multiple PEs in the array processor and the Wallace tree multipliers inside the PEs can separately mine parallelism in the K dimension and the N dimension of the matrixes, so that the overall degree of parallelism is further improved, thereby accelerating the processing of the matrix multiplication operation.

In another aspect, the present application further provides a non-transitory computer storage medium. The computer storage medium may be the non-transitory computer storage medium included in the apparatus in the above embodiments, or a stand-alone computer storage medium which has not been assembled into the apparatus. The non-transitory computer storage medium stores one or more programs. The one or more programs may be executed by a processor including an array processor having k processing units. When the one or more programs are executed by a processor, the processor is to: read 1×n row vectors in an M×N multiplicand matrix to each processing unit in the array processor, each processing unit including a Wallace tree multiplier having n multipliers and n−1 adders; read each of n×1 rcolumn vectors in an n×k submatrix in an N×K multiplier matrix to a corresponding processing unit in the array processor respectively; execute in parallel a vector multiplication operation on each column vector and the row vector by using the processing units, the Wallace tree multiplier in each processing unit being configured to execute in parallel a multiplication operation and an addition operation in the vector multiplication operation; and output a result obtained by each processing unit after executing the multiplication operation, where n, k, M, and N are integers greater than 1.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A processor comprising:
a data bus; and
an array processor having k processing units;
the data bus configured to sequentially read 1×n row vectors from an M×N multiplicand matrix and input the 1×n row vectors to each processing unit in the array processor, read an n×k submatrix from an N×K multiplier matrix and input each of n×1 column vectors of the n×k submatrix to a corresponding processing unit in the array processor, and output a result obtained by each processing unit after executing a vector multiplication operation; and
the each processing unit in the array processor configured to execute in parallel the vector multiplication operation on the input 1×n row vectors and the input n×1 column vectors, and the each processing unit comprising a Wallace tree multiplier having n multipliers and n−1 adders, the Wallace tree multiplier in the each processing unit being configured to execute in parallel a multiplication operation and an addition operation in the vector multiplication operation,
wherein n, k, M, and N are integers greater than 1.

2. The processor according to claim 1, wherein the processor further comprises a first on-chip memory unit, a second on-chip memory unit, and a third on-chip memory unit,
wherein the sequentially read 1×n row vectors from an M×N multiplicand matrix and input the 1×n row vectors to each processing unit in the array processor comprises:
buffer the M×N multiplicand matrix to the first on-chip memory unit;
sequentially read the 1×n row vectors of the M×N multiplicand matrix from the first on-chip memory unit and input the 1×n row vectors to the each processing unit in the array processor,
wherein the read an n×k submatrix from an N×K multiplier matrix and input each of n×1 column vectors of the n×k submatrix to a corresponding processing unit in the array processor comprises:
buffer the N×K multiplier matrix to the second on-chip memory unit;
read an n×k submatrix of the N×K multiplier matrix from the second on-chip memory unit and input each of the n×1 column vectors of the n×k submatrix to the corresponding processing unit in the array processor respectively, wherein the output a result obtained by each processing unit after executing a vector multiplication operation comprises:

output a result obtained by the each processing unit after executing the vector multiplication operation to the third on-chip memory unit; and buffer data of the third on-chip memory unit.

3. The processor according to claim 2, wherein the buffer operations of the data bus and the vector multiplication operations of the processing units in the array processor are executed in parallel in a back-and-forth manner.

4. The processor according to claim 2, wherein the first on-chip memory unit stores data in units of rows, and the second on-chip memory unit stores data in units of columns.

5. The processor according to claim 4, wherein the third on-chip memory unit stores data in units of rows.

6. A method for executing a matrix multiplication operation on a processor, the processor comprising an array processor having k processing units, the method comprising:

reading 1×n row vectors in an M×N multiplicand matrix to each processing unit in the array processor, the each processing unit comprising a Wallace tree multiplier having n multipliers and n−1 adders;

reading each of n×1 column vectors in an n×k submatrix in an N×K multiplier matrix to a corresponding processing unit in the array processor respectively;

executing in parallel a vector multiplication operation on each of the n×1 column vectors and each of the 1×n row vectors by using the processing units, the Wallace tree multiplier in the each processing unit being configured to execute in parallel a multiplication operation and an addition operation in the vector multiplication operation; and outputting a result obtained by the each processing unit after executing the vector multiplication operation, wherein n, k, M, and N are integers greater than 1.

7. The method according to claim 6, wherein the processor further comprises a first on-chip memory unit, a second on-chip memory unit, and a third on-chip memory unit;

the reading 1×n row vectors in an M×N multiplicand matrix to the each processing unit comprises:

buffering the M×N multiplicand matrix to the first on-chip memory unit, and sequentially reading the 1×n row vectors of the M×N multiplicand matrix from the first on-chip memory unit to the each processing unit in the array processor;

the reading each of n×1 column vectors in an n×k submatrix in an N×K multiplier matrix to a corresponding processing unit respectively comprises:

buffering the N×K multiplier matrix to the second on-chip memory unit, and sequentially reading the n×k corresponding submatrix from the second on-chip memory unit and outputting the n×1 column vectors in the submatrix to corresponding processing units in the array processor respectively; and the outputting a result obtained by the each processing unit after executing the vector multiplication operation comprises:

outputting the result obtained by the each processing unit after executing the vector multiplication operation to the third on-chip memory unit, and buffering data of the third on-chip memory unit.

8. The method according to claim 7, wherein the vector multiplication operations and the data buffer operations are executed in parallel in a back-and-forth manner.

9. The method according to claim 7, wherein the method further comprises:

storing data on the first on-chip memory unit in units of rows; and storing data on the second on-chip memory unit in units of columns.

10. The method according to claim 9, wherein the method further comprises:

storing data on the third on-chip memory unit in units of rows.

11. The method according to claim 7, wherein the first on-chip memory unit stores data in units of rows, and the second on-chip memory unit stores data in units of columns.

12. The method according to claim 8, wherein the method further comprises:

storing data on the first on-chip memory unit in units of rows; and storing data on the second on-chip memory unit in units of columns.

* * * * *